US008226488B2

(12) United States Patent
Chen et al.

(10) Patent No.: US 8,226,488 B2
(45) Date of Patent: Jul. 24, 2012

(54) GAMING MACHINE WITH MODULAR BUS

(75) Inventors: Xuedong Chen, Reno, NV (US); Steven G. LeMay, Reno, NV (US); John Goodman, Reno, NV (US)

(73) Assignee: IGT, Reno, NV (US)

( * ) Notice: Subject to any disclaimer, the term of this patent is extended or adjusted under 35 U.S.C. 154(b) by 792 days.

(21) Appl. No.: 11/487,033

(22) Filed: Jul. 14, 2006

(65) Prior Publication Data
US 2008/0026854 A1   Jan. 31, 2008

(51) Int. Cl.
*A63F 9/24*   (2006.01)
*A63F 13/00*   (2006.01)
*G06F 17/00*   (2006.01)
*G06F 19/00*   (2011.01)

(52) U.S. Cl. ........................................... 463/43; 463/46
(58) Field of Classification Search ...................... 463/43
See application file for complete search history.

(56) References Cited

U.S. PATENT DOCUMENTS

| 4,652,998 | A | | 3/1987 | Koza et al. |
|---|---|---|---|---|
| 5,379,382 | A | | 1/1995 | Work et al. |
| 5,379,920 | A | | 1/1995 | Lisak |
| 5,643,086 | A | | 7/1997 | Alcorn et al. |
| 5,708,838 | A | | 1/1998 | Robinson |
| 5,761,647 | A | | 6/1998 | Boushy |
| 5,857,086 | A | * | 1/1999 | Horan et al. ................. 710/306 |
| 5,909,559 | A | * | 6/1999 | So ................................ 710/307 |
| 5,958,020 | A | | 9/1999 | Evoy et al. |
| 6,071,190 | A | | 6/2000 | Weiss et al. |
| 6,088,802 | A | | 7/2000 | Bialick et al. |
| 6,104,815 | A | | 8/2000 | Alcorn et al. |
| 6,106,396 | A | | 8/2000 | Alcorn et al. |
| 6,117,010 | A | | 9/2000 | Canterbury et al. |
| 6,149,522 | A | | 11/2000 | Alcorn et al. |
| 6,251,014 | B1 | | 6/2001 | Stockdale et al. |

(Continued)

FOREIGN PATENT DOCUMENTS

EP    1 094 425 A2    4/2001

(Continued)

OTHER PUBLICATIONS

U.S. Appl. No. 09/414,659, filed Oct. 5, 1999.

(Continued)

*Primary Examiner* — Dmitry Suhol
*Assistant Examiner* — Kevin Y Kim
(74) *Attorney, Agent, or Firm* — Weaver Austin Villeneuve & Sampson LLP

(57) ABSTRACT

A modular gaming machine system has a first gaming box with a main processor configured to control a game of chance played on the gaming machine by executing game code that uses gaming instructions received from a PCI-e controller. At least one interface is coupled to the first gaming box to receive a PCI Express (PCI-e) bus to communicatively link the PCI-e controller and the main processor. A second gaming box contains the PCI-e controller for communicating with at least one peripheral device on the gaming machine and at least one critical gaming device in communication with the PCI-e controller. There is at least one access port coupled to the second gaming box to receive a free end of the PCI-e bus, wherein the PCI-e bus extends outside the first and second gaming box and is secured by one or more doors, locks, sensors, evidence tape, and/or combinations thereof.

22 Claims, 6 Drawing Sheets

U.S. PATENT DOCUMENTS

| | | | |
|---|---|---|---|
| 6,280,318 B1 | 8/2001 | Criss-Puszkiewicz et al. | |
| 6,620,047 B1 | 9/2003 | Alcorn et al. | |
| 6,685,567 B2 | 2/2004 | Cockerille et al. | |
| 6,968,405 B1 | 11/2005 | Bond et al. | |
| 7,118,483 B2 | 10/2006 | Beadell et al. | |
| 2005/0128217 A1* | 6/2005 | Cohen | 345/603 |
| 2005/0228932 A1 | 10/2005 | Chen et al. | |
| 2006/0036874 A1* | 2/2006 | Cockerille et al. | 713/187 |
| 2006/0046819 A1* | 3/2006 | Nguyen et al. | 463/16 |
| 2007/0004501 A1* | 1/2007 | Brewer et al. | 463/25 |

FOREIGN PATENT DOCUMENTS

| | | |
|---|---|---|
| EP | 1 094 425 A3 | 5/2003 |
| EP | 2044519 | 4/2009 |
| WO | 2008/008250 | 1/2008 |

OTHER PUBLICATIONS

U.S. Appl. No. 09/687,243, filed Oct. 13, 2000.

Jim Stockdale, Description of the IGT Netplex Associated Interface System, pp. 1-2; System used in public prior to Oct. 6, 1998.

Members of B-Link Technical Committee, "Summary of Comments by Members Re Proposed Charters and Goals & Technology", 2 Pages, Oct. 26, 1999.

Notification Concerning Transmittal of International Preliminary Report on Patentability dated Jan. 22, 2009 for PCT Application No. PCT/US2007/015455.

International Search Report and Written Opinion dated Aug. 5, 2008 from PCT International Application No. PCT/US2007/015455.

Communication Relating to the Results of the Partial International Search Report dated Apr. 25, 2008 from PCT Application No. PCT/US2007/015455.

* cited by examiner

GAMING MACHINE WITH MODULAR BUS

FIELD OF THE INVENTION

The present invention relates to connections for gaming machine peripherals/components. More particularly, the present invention relates to connections between the gaming peripherals/connections and the gaming machine using PCI-Express (PCI-e).

BACKGROUND OF THE INVENTION

There are a wide variety of associated devices that can be connected to a gaming machine such as a slot machine or video poker machine. Some examples of these devices are lights, ticket printers, card readers, speakers, bill validators, coin acceptors, display panels, key pads, and button pads. Many of these devices are built into the gaming machine. A number of devices may be grouped together in a separate box, called a top box, that is placed on top of the gaming machine.

The features of any device are usually controlled by a "master gaming controller" within the gaming machine. For example, during a game, the master gaming controller might instruct lights to go on and off in various patterns, instruct a printer to print a ticket or send information to be displayed on a display screen. For the master gaming controller to perform these operations, connections from the device are wired directly into some type of electronic board (e.g., a "back plane") containing the master gaming controller.

To operate a device, the master gaming controller requires parameters, operation features and configuration information specific to each peripheral device. This information is incorporated into software and stored in some type of memory device on the master gaming controller. This device specific software operates the features of the device during a game. As an example, to operate a set of lights, the software for the master gaming controller would require information such as the number and types of lights, features of the lights, signals that correspond to each feature, and the response time of the lights.

One disadvantage of the current operation method for devices controlled by a master gaming controller is that each time a device is replaced, the gaming machine must be shutdown. Then, the wires from the device are disconnected from the master gaming controller and the master gaming controller is rewired for the new device. A device might be replaced to change the game features or to repair a malfunction within the device. Similarly, if the circuit board containing the master gaming controller or the master gaming controller itself needs repair, then the wiring from the all the devices connected to the gaming controller must be removed before the gaming controller can be removed. After repair or replacement, the master gaming controller must be rewired to all of the devices. This wiring process is time consuming and can lead to significant down-time for the gaming machine. Further, the person performing the installation requires detailed knowledge of the mechanisms within the gaming machine. Additionally, the high-pin-counts used as interconnects between components in the gaming machine is very cumbersome. The pins are easy to bend and/or may not be connected properly.

Another disadvantage involves the software for the devices. When a new device is installed on a gaming machine, software specific to the device must be installed on the master gaming controller. Again, the gaming machine must be shutdown and the person performing this installation process requires detailed knowledge of the gaming machine and the device.

A further disadvantage is the difficulty to maintain low temperatures on the processor boards. As technology in the gaming industry progresses, the once traditional mechanically-driven reel slot machines have been replaced with electronic counterparts having cathode ray tube (CRT) video displays or the like. These video/electronic gaming advancements enable the operation of more complex gambling games which would not otherwise be possible on mechanical-driven gambling machines. For example, in addition to reel slot machines, it is now common to observe stand alone or multiple platform video electronic games including Keno, Blackjack, Poker, Pai Gow, and all the variations thereof, in even the smallest gaming establishments. These electronic game devices may comprise numerous internal electrical components including, for example, a power supply, a lighted display and a central processing unit (CPU). During extensive use, and due to the fact that these game devices are always "on" even when not in use, many of the internal electrical components thereof require cooling.

Parallel bus architectures play a vital role in current gaming machines. However, parallel busses limit the physical location of peripheral controllers, like the video card, universal serial bus (USB) host controller, Ethernet controller, gaming device controllers, and other similar controllers. The peripheral controllers must be positioned next to the CPU due to electromagnetic interference (EMI) considerations and the complexity to extend a high frequency parallel bus. For this reason, the CPU and peripheral controllers are located on the same processing board. Unfortunately, this tight and close connection between the peripheral controllers may cause many issues and/or inconveniences in gaming machine design. For example, as video technology improves, the video card generates and dissipates a lot of heat at run time. However, the CPU itself also generates a lot of heat. Therefore special heat design considerations must be taken into account to handle the high temperatures. Additionally, since all the peripheral controllers must reside on the same processing board with the CPU, it is difficult to minimize the size of the gaming box. This, in turn, limits the flexibility in mechanical design of an entire gaming machine.

Moreover, the physical connections between the master gaming controller, back plane board, and peripheral devices are complex. Almost all gaming machine peripheral devices are first connected to the back plane. Another connection is then necessary to connect the peripheral devices from the back plane to the master gaming controller since the peripheral controllers reside on the master gaming controller. As briefly discussed above, this results in many wire connections between the master gaming controller and the back plane, thus increasing connection complexity, which causes an increase in cost, reliability, EMI, and other disadvantages.

FIG. 1 illustrates a conventional gaming machine that is currently cooled using at least one box fan 3. The box fan 3 is located within the gaming machine 2 and strategically placed on or near internal components requiring cooling, depending on space provisions. The box fan 3 distributes air from within the machine onto or around these internal components for convection cooling thereof. Typically, a housing 6 of the gamine machine 2 includes an air intake vent 4 to introduce fresh air to the internal components in the gaming machine. Typically, top boxes and base cabinets of a gaming machine are cooled separately. Therefore, it is common to have intake and exhaust ports for the top box and base cabinet, respectively. The housing 6 further includes an air exhaust vent 5 to exhaust air from the gaming machine. Generally, the air intake vent 4 and air exhaust vent 5 are spaced-apart along the side of the housing to enable air circulation across the internal components. Vent location, however, is often dictated by space limitations.

During operation of the fan 3, the air is drawn into the housing 6 through intake port 4. After flowing past the internal components, the air exits the housing through exhaust port 5. As a consequence of this arrangement, the air driven by the box fan 3 is limited to the air that has circulated through the internal components, both electrical and mechanical, in the gaming machine interior. Correspondingly, the air may be heated by internal components before the air reaches other heat critical components. By way of example, the air may be heated by a monitor or coin hopper closer to the air inlet 4 before the air reaches a CPU proximate to the box fan 3. As some internal components may be more heat sensitive, this pre-heating of cooling air used by the box fan 3 may diminish heat removal for the heat sensitive components.

In addition to the above disadvantages, it is sometimes necessary in gaming machine design to position critical components in isolated or confined locations such as on the main processing board that is enclosed in a gaming box. When these critical components are heat sensitive, this restricted placement may diminish the cooling efficiency of the box fan 3. Thus, dissipating heat to maintain low temperatures on the processing boards is critical to secure the normal functioning of the electronic components, to stabilize their operation, and extend their operational life.

SUMMARY

A modular gaming machine system utilizes a PCI-e bus to communicate between gaming machine peripherals/components. In an embodiment, the gaming machine system has a first gaming box with a main processor configured to control a game of chance played on the gaming machine by executing game code that uses gaming instructions received from a PCI-e controller. At least one interface is coupled to the first gaming box to receive a PCI-e bus to communicatively link the PCI-e controller and the main processor. A second gaming box contains the PCI-e controller for communicating with at least one peripheral device on the gaming machine and at least one critical gaming device in communication with the PCI-e controller. There is at least one access port coupled to the second gaming box to receive a free end of the PCI-e bus, wherein the PCI-e bus extends outside the first and second gaming box and is secured by one or more doors, locks, sensors, evidence tape, and/or combinations thereof.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Figure 1:
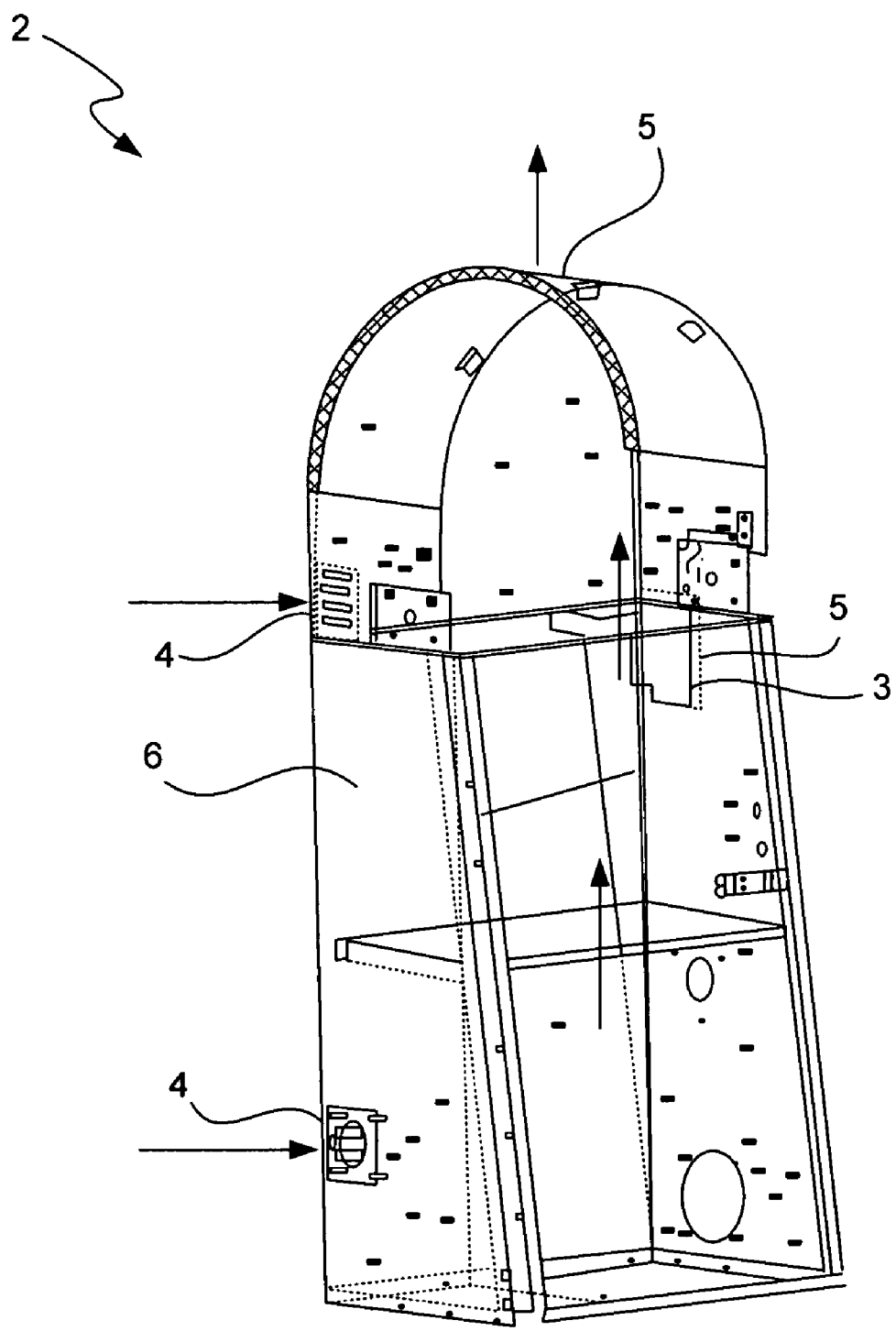
FIG. 1 is a perspective view of a gaming machine incorporating conventional box fans to cool internal elements of the gaming machine.

Embodiments are described herein in the context of a gaming machine with a modular bus. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The invention utilizes PCI-Express (PCI-e) buses as communication connections between the gaming peripherals/components and the gaming machine to overcome the disadvantages discussed above. PCI-e is the open standards-based successor to PCI for server and client system input/output interconnects. PCI-e uses high-speed serial link technology with high-speed point-to-point serial busses that allows for many advantages over shared parallel buses. First, a PCI-e bus has high bandwidth (i.e. 2.5 gigabits per second per lane peak theoretical bandwidth) that allows for real-time interaction with the gaming peripheral devices and the ability to utilize high-end graphics capability. Additionally, the addition of additional lanes on the PCI-e bus increases the speed without having to change the gaming machine system. PCI-e can transmit in one direction while simultaneously receiving from the other direction. This bi-directionality provides the potential for doubling the overall effective bandwidth or throughput.

Second, the high data rates are achieved reliably using low-voltage differential signaling with little to no EMI. Third, PCI-e utilizes low-pin-count interconnects. This decreases the possibility of bending, breaking, or mis-aligning pins. Fourth, PCI-e provides for a point-to-point link dedicated to each device, rather than a shared PCI bus, which allows for faster data rates. The entire bandwidth of each PCI-e bus is dedicated to the device at the end of the link and thus, multiple PCI-e devices can be active without interfering with each other. Furthermore, unlike USB, PCI-e does not require user level protocol to exchange information between the gaming machine peripheral devices and the main processor. The PCI-e bus is software transparent. Lastly, PCI-e has "active power" power management that lowers power consumption when the bus is not active (i.e. no data is being sent between components or peripherals). PCI-e technology is known to those of ordinary skill and will not be discussed in detail herein to prevent obfuscation of the present invention.

Gaming Machine Device

Figure 2:
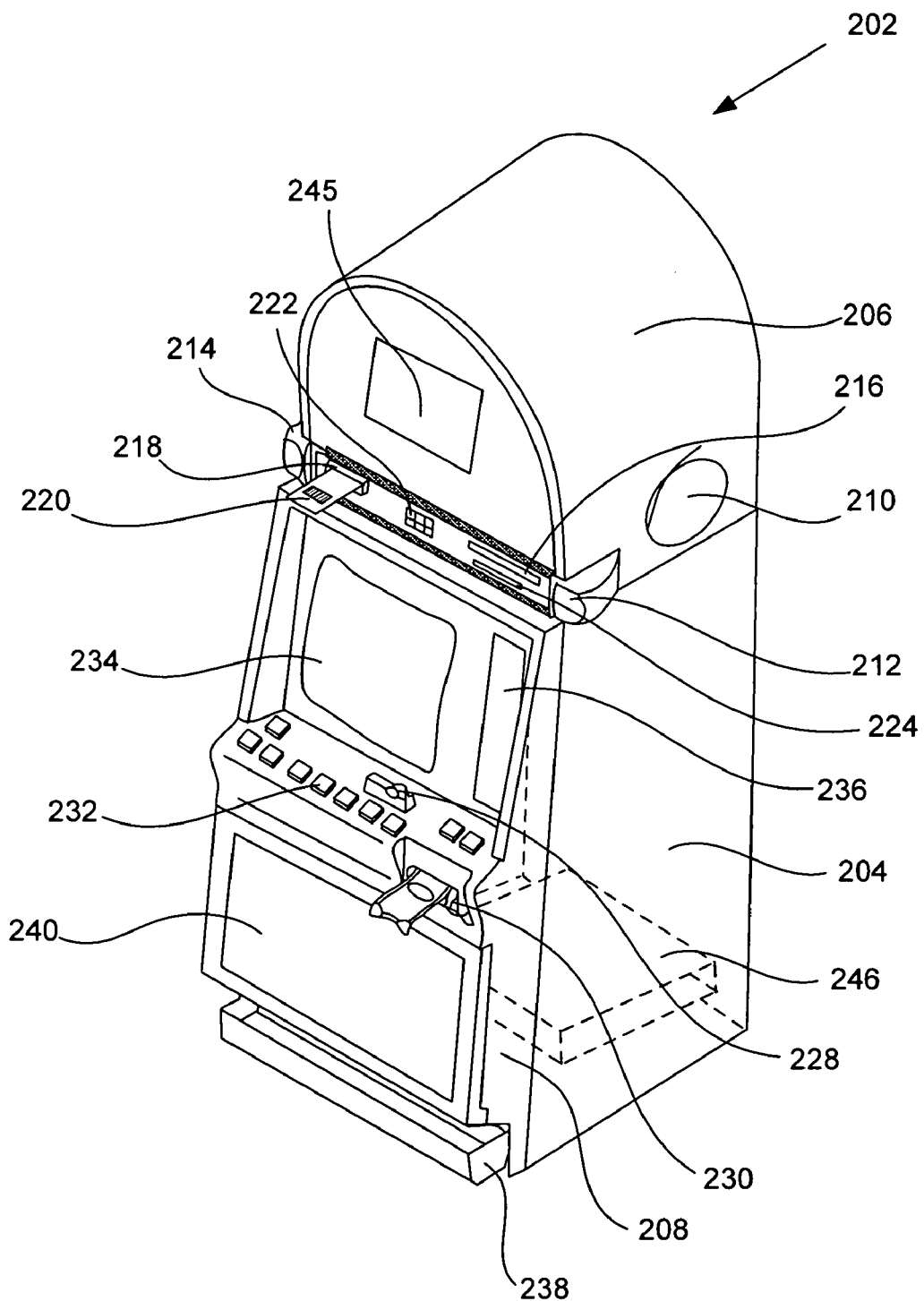
FIG. 2 illustrates a gaming machine and exemplary peripherals in accordance with an embodiment of the invention.

FIG. 2 illustrates a gaming machine and exemplary peripherals in accordance with an embodiment of the invention. Machine 202 includes a main cabinet 204, which generally surrounds the machine interior (FIG. 3) and is viewable by users. The main cabinet 204 includes a main door 208 on the front of the machine 202, which opens to provide access to the interior of the machine 202. Attached to the main door 208 are player-input switches or buttons 232, a coin acceptor 228, and a bill validator 230, a coin tray 238, and a belly glass 240. Viewable through the main door is a video display or monitor 234 and an information panel 236. The monitor 234 will typically be a CRT, high resolution flat-panel LCD, or other conventional electronically controlled video monitor.

The information panel 236 may be a backlit, silk-screened glass panel with lettering to indicate general game information including, for example, a game denomination (e.g. $0.25 or $1). The bill validator 230, player-input switches 232, video monitor 234, and information panel 236 are devices used to play a game on the gaming machine 202. The devices are controlled by circuitry (e.g. the master gaming controller 246) housed inside the main cabinet 204 of the machine 202. Many possible games, including mechanical slot games, video slot games, video poker, video black jack, video pachinko and lottery, may be provided with gaming machines of this invention.

The gaming machine 202 may have a top box 206, which sits on top of the main cabinet 204. As stated above, the top box 206 may house a number of devices, which may be used to add features to a game being played on the gaming machine 202, including speakers 210, 212, 214, a ticket printer 218 which prints bar-coded tickets 220, a key pad 222 for entering player tracking information, a florescent display 216 for displaying player tracking information, and a card reader 224 for entering a magnetic striped card containing player tracking information. The top box 206 may also include a secondary monitor 245 or any other additional devices such as a bonus wheel or a back-lit silk screened panel that may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 202.

Gaming machine 202 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those skilled in the art will understand that the invention described below can be deployed on most any gaming machine now available or hereafter developed.

Figure 3:
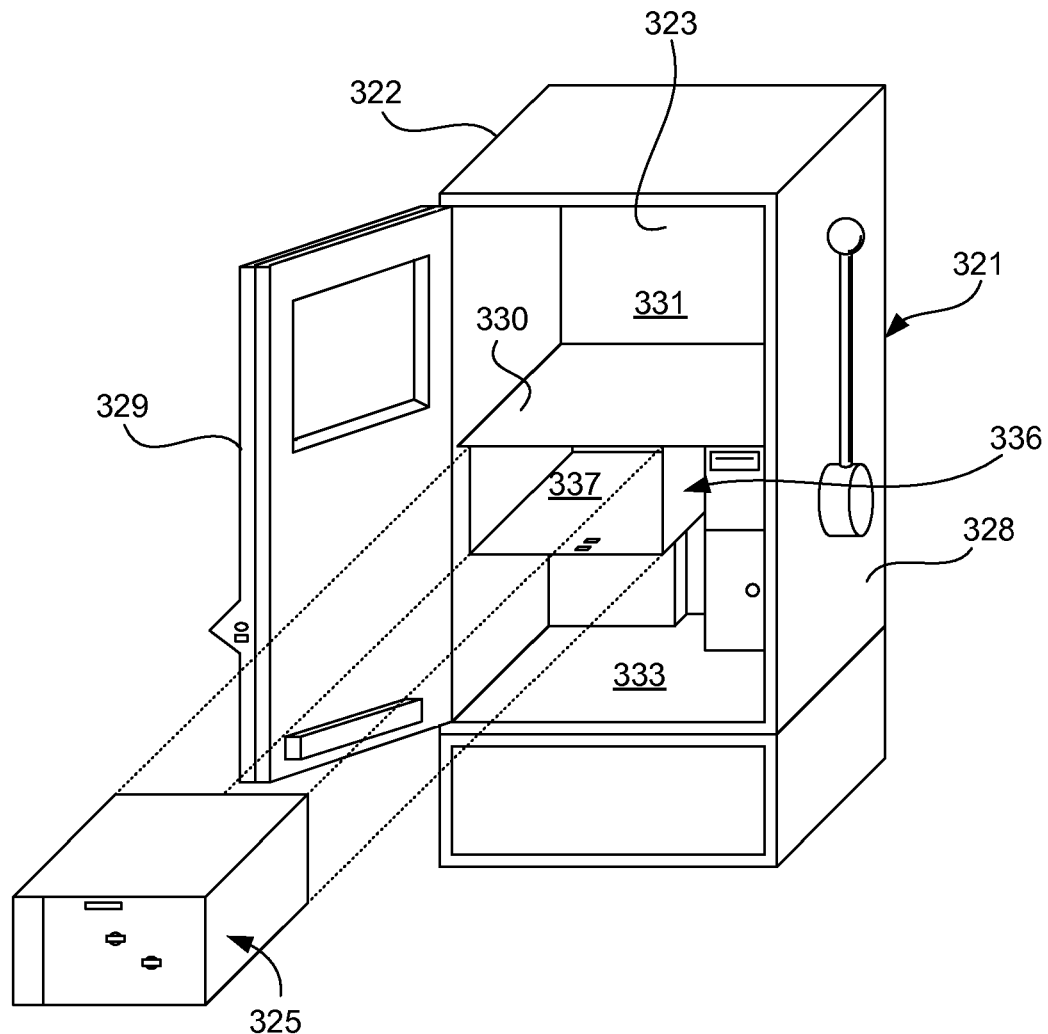
FIG. 3 illustrates an embodiment of a gaming machine with the cabinet door in an open position.
Figure 4:
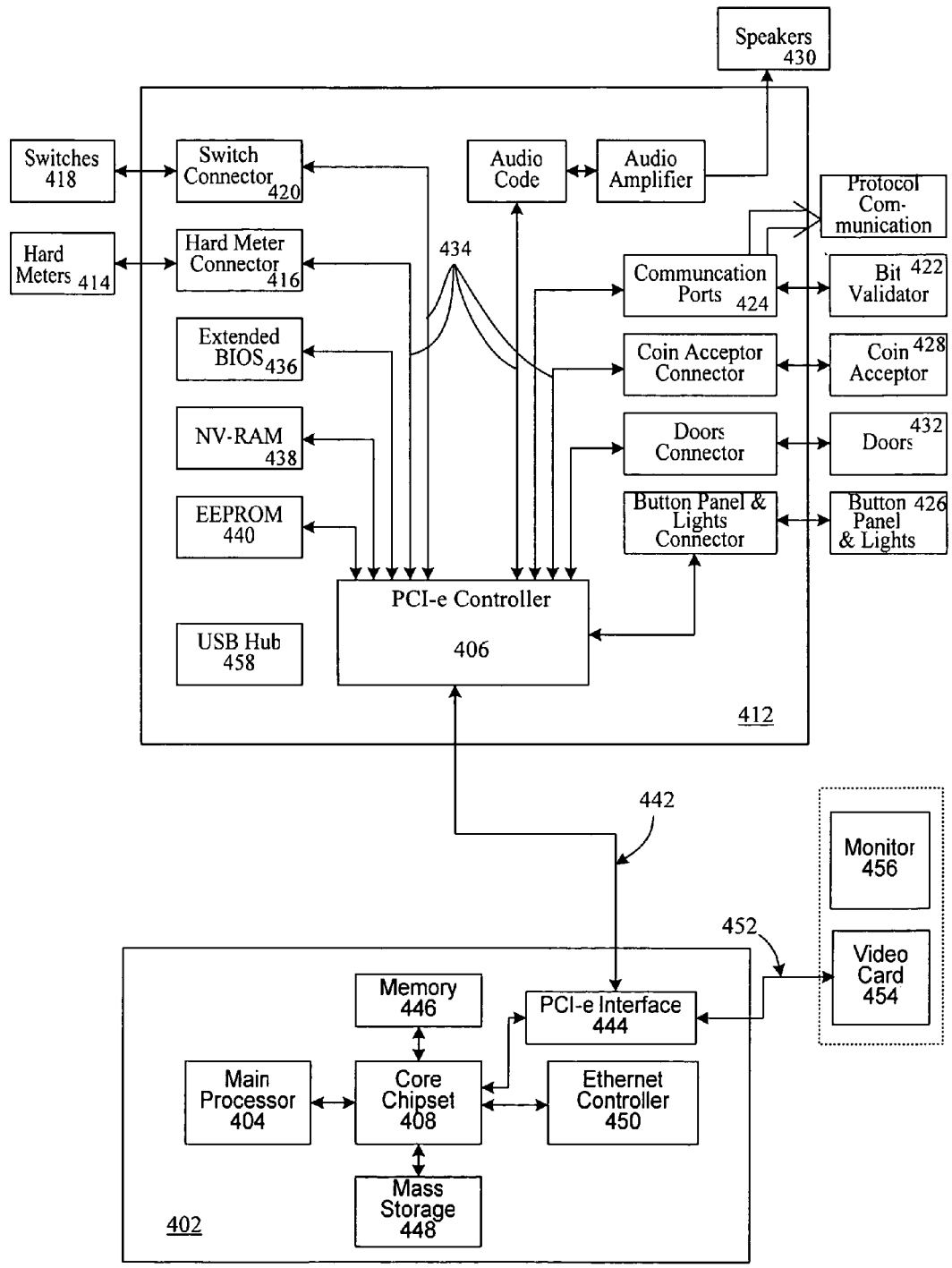
FIG. 4 is a block diagram of the components of the main processor board and back plane in accordance with an embodiment of the present invention.

FIG. 3 illustrates an embodiment of a gaming machine with the cabinet door in an open position. The gaming machine housing 322 is illustrated including a main cabinet 328 and a cabinet door 329 enabling access to the interior portion 323. A conventional cabinet locking device (not shown) locks the cabinet door 329 to the main cabinet 328 to prevent unauthorized access by gaming patrons. Briefly, the housing 322 may include an upper shelf 330 forming a monitor compartment 331 dimensioned to receive and support a monitor therein. Positioned below the upper shelf 330 is a lower compartment 333 containing other essential gaming machine electronic components therein. Further included in the lower compartment 333 is an enclosure support member 336 mounted to the housing 322, and adapted to slidably receive and support the CPU enclosure 325. In this arrangement, the CPU enclosure 325 is slidably supported in the support member 336 in a manner to electrically couple electrical connectors (not illustrated) on the back of the enclosure 325 to other electrical connectors, such as the back plane (FIG. 4). The pocket 337 may be sized and dimensioned slightly larger than the rectangular transverse cross-sectional dimension of the CPU enclosure 325 to ensure a proper fit and prevent pin bending and/or misalignment between the connectors. Such sliding alignment may be provided by conventional alignment techniques.

Gaming Machine Peripherals/Components

The CPU enclosure 325 may contain a main processor board for connection to a back plane. FIG. 4 is a block diagram of the components of the main processor board and back plane in accordance with an embodiment of the present invention. The back plane 412 may contain the PCI-e controller 406 for communicating with peripheral devices via PCI-e busses 434. Any other type of system bus may also be used. For exemplary purposes only and not intended to be limiting to the following peripheral devices, the hard meter 414 (to display the amount of credit on a gaming machine) may communicate with the PCI-e controller 406 through hard meter connector 416; switches 418 may communicate with the PCI-e controller 406 through switch connector 420; and the bill validator 422 may communicate with the PCI-e controller 406 through communication port 424. Other peripheral devices may be a button panel and lights 426, coin acceptor 428, and speakers 430. To provide for security on the gaming machine, the doors 432 may be in communication with the PCI-e controller 406 to alert a user if the door 432 is opened. Those of ordinary skill will now realize that many other peripheral devices and controllers, such as a sound card, network card, USB host controller, PCI field programmable gate array (FPGA), Ethernet controller, and the like, may be positioned on the back plane 412 and coupled to the PCI-e controller 406.

The PCI-e controller 406 may also communicate with critical gaming devices positioned on the back plane 412. As discussed above, all peripheral controllers are positioned on the master gaming controller. However, serializing hardware over the PCI-e bus allows for the ability to position critical gaming devices in different locations, such as the back plane 412. Since PCI-e busses use low-voltage differential signaling, no EMI occurs. Furthermore, removing peripheral controllers and devices from the main processor board will decrease the temperature in the CPU enclosure.

Critical gaming devices may be any device designed or configured to control critical gaming functions on the gaming machine. For exemplary purposes, and not intended to be limiting, critical gaming devices may include a static, non-volatile random access memory (NV-RAM) 438, electronic erasable programmable read only memory (EEPROM) 440, extended basic input output system (BIOS) 436, PCI-e controller 406, and video card 454. The NV-RAM 438 may store critical gaming programs and functions and the EEPROM 440 may store critical gaming machine data and functions.

The PCI-e controller 406 may communicate with the main processor 404 via PCI-e bus 442. An access port on the back plane 412 may receive one end of the PCI-e bus 442 and an interface 444 on the main processor board 402 may receive the free end of the PCI-e bus 442. The PCI-e interface is coupled to the core chipset 408, which controls communication between the gaming machine components. Any requests to or from the devices on the main processor board 402 (such as memory 446, mass storage 448, Ethernet controller 450, or the main processor 404) must first go through the core chipset 408. The main processor 404 is designed or configured to control the game of chance played on the gaming machine by executing game code and/or instructions received from the PCI-e controller 406, which may be communicated from NV-RAM 438 or EEPROM 440.

Another PCI-e bus 452 may be used to link the main processor 404 with a video card 454. The use of a PCI-e bus allows a user to position the video card in any location in the gaming machine. For exemplary purposes only and not intended to be limiting, the video card may be built directly into the gaming machine monitor 456.

Relocating devices from the main processor board 402 to other locations, such as the back plane, decreases the temperature in the CPU enclosure. Additionally, by relocating the devices to the back plane 412, only the back plane 412 needs to be customized. Customization of the main processor is not necessary and may be a generic processing board, which decreases costs and is easier to upgrade as technology improves, such as with a more advance CPU and/or memory. Furthermore, cable design is simplified with the use of only two boards, the main processor board and back plane. If any device needs repair or an update, only the back plane needs to be removed and no complicated wires need to be disconnected from the main processor board.

In another embodiment, other devices may also be separated from both the main processor board 402 and the back plane 412 using PCI-e connections. For exemplary purposes only and not intended to be limiting, the audio code 460 and amplifier 462 may be offloaded from the back plane 412 to form a PCI-e based standalone audio solution. Similarly ethernet controller 450, USB hub 458, and other devices may also have their own PCI-e connection.

Authentication and Security

Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly. Thus, security is an important issue for gaming machine devices.

To secure the main processor board 402 and back plane 412, each may be secured within separate sealed gaming boxes. The gaming boxes may be sealed or secured by one or more doors, locks, sensors, evidence tape, and/or combinations thereof. Additionally, PCI-e busses 442, 452 extend outside the gaming boxes, it too must be enclosed within an enclosure and may be secured by one or more doors, locks, sensors, evidence tape, and/or combinations thereof.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Figure 5:
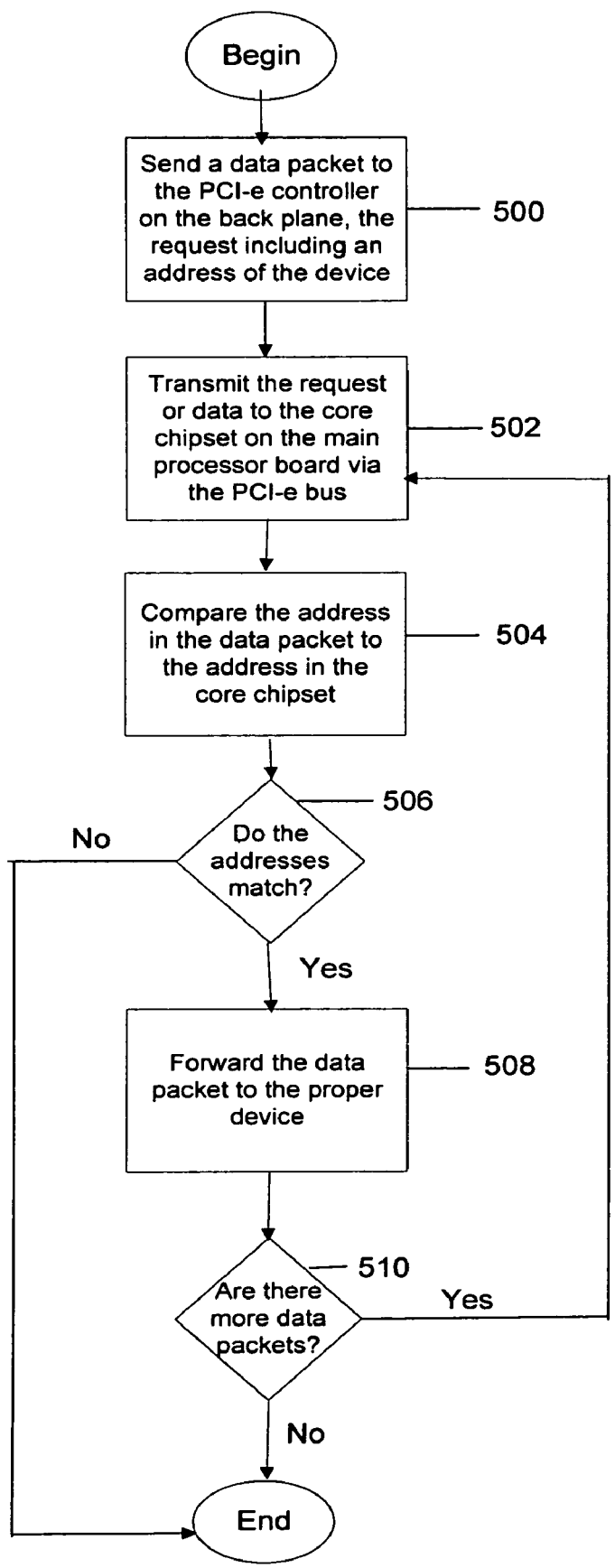
FIG. 5 is a flow chart illustrating a method to authenticate requests in accordance with an embodiment of the invention.

Authentication of data packets or requests are also necessary to ensure security of the gaming machine. In one embodiment, the core chipset may be used to authenticate the data packets. FIG. 5 is a flow chart illustrating a method to authenticate requests in accordance with an embodiment of the invention. Since the core chipset monitors and handles all requests to read and write to various components, it may also authenticate each request to ensure the requests are valid. A data packet produced by a gaming machine peripheral/component may be sent to the PCI-e controller on the back plane at 500. The request may include the address of the device. The data packet is transmitted to the core chipset on the main processor board via the PCI-e bus at 502. The core chipset compares the address in the data packet to the address stored in the core chipset at 504. The core chipset may have an address database listing an address for each component on the gaming machine. If the addresses matched at 506, the data packet would be forwarded to the proper device at 508. Otherwise, the data packet would be denied. If there are additional data packets at 510, the steps from 502 would be repeated. For additional security, the core chipset may periodically be reprogrammed with different addresses for each component. This may be accomplished by any known means, such as through a connection to a central gaming server via the Ethernet controller or wireless transmissions.

Figure 6:
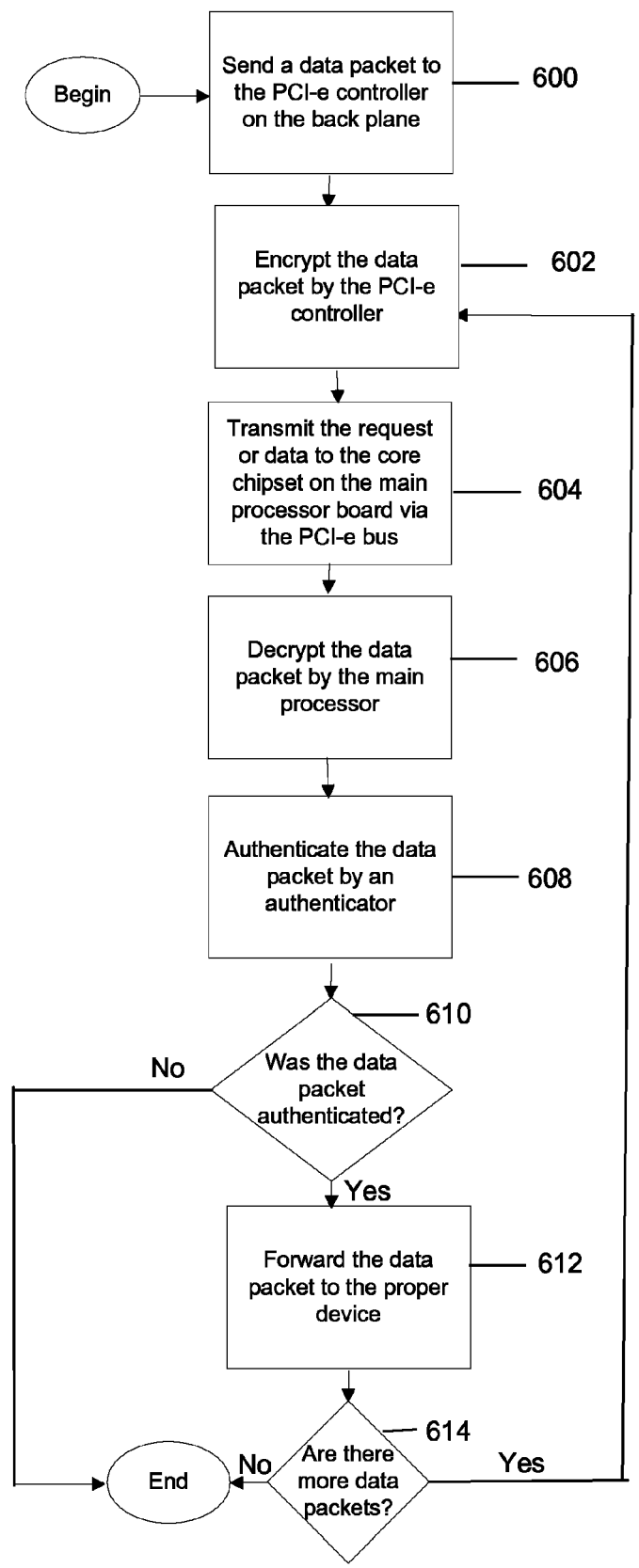
FIG. 6 is a flow chart illustrating another embodiment to authenticate requests in a gaming machine.

In another embodiment, the PCI-e controller may encrypt the data packets sent to the main processor. FIG. 6 is a flow chart illustrating another embodiment to authenticate requests in a gaming machine. Data packets are sent to the PCI-e controller on the back plane from the gaming machine peripherals/components at 600. The PCI-e controller may encrypt the data packets at 602. For additional security, the data packet may also include an address as in FIG. 5. The encrypted data packet may be transmitted to the core chipset on the main processor board via the PCI-e bus at 604 for delivery to the main processor for the decryption at 606. An authenticator may authenticate the data packet at 608. If the data packet is authenticated at 610, it may be forwarded to the proper device at 612. Otherwise the data packet is ignored. If there are additional data packets at 614, the steps from 602 would be repeated at 614.

In another embodiment, a pre-encrypted data file signed with a private key may be stored in the PCI-e controller on the back plane. The main processor and/or core chipset may enquiry, read, and decrypt the data file to determine if it is authentic and determine if the PCI-e controller on the back plane is trustable.

In yet another embodiment, various devices may be programmed as master devices and others as slave devices. Slave devices are passive and not able to read or write to other devices. Master and slave devices are known in the art and will not be discussed herein. However, for exemplary purposes only and not intended to be limiting, the PCI-e controller may be a master device and the peripheral devices, such as the bill validator, are slave devices that only respond to requests from the PCI-e controller. Moreover, non-critical data and/or only encrypted data may be saved to the slave devices for additional security.

There are various authentication methods, such as those discussed in: 1. U.S. Pat. No. 6,106,396, issued Aug. 22, 2000, entitled "Electronic casino gaming system with improved play capacity, authentication and security"; 2. U.S. Pat. No. 6,620,047, issued Sep. 16, 2003, entitled "Electronic gaming apparatus having authentication data sets"; or 3. U.S. Pat. No. 6,685,567 issued Feb. 3, 2004, entitled "Process verification" which are incorporated herein in their entirety and for all purposes.

While embodiments and applications of this invention have been shown and described, it would be apparent to those skilled in the art having the benefit of this disclosure that many more modifications than mentioned above are possible without departing from the inventive concepts herein. For example, different critical devices may be relocated to the back plane whereas other devices may remain on the main processor board. The invention, therefore, is not to be restricted except in the spirit of the appended claims.

What is claimed is:

1. A modular gaming machine system, comprising:
   a gaming machine including:
   a cabinet having a main door;
   a display, coupled to said cabinet, configured to display a game of chance;
   a first gaming enclosure, secured within and enclosed by the cabinet, enclosing a main processor;
   at least one interface coupled to the first gaming enclosure to receive a first PCI-e bus;
   a second gaming enclosure, secured within and enclosed by the cabinet, enclosing a PCI Express (PCI-e) controller for communicating with at least one peripheral device on the gaming machine, wherein the second gaming enclosure enclosing the PCI-e controller is accessed by opening the main door of the cabinet;
   at least one critical gaming device coupled to the second gaming enclosure and in communication with the PCI-e controller, wherein the main processor is configured to control a game of chance played on the gaming machine by executing game code that uses a plurality of gaming instructions received via a first PCI-e bus from the PCI-e controller, said PCI-e controller connected via a second PCI-e bus to one of the at least one critical gaming device; and
   at least one access port coupled to the second gaming enclosure to receive a free end of the first PCI-e bus, the first PCI-e bus for communication between the PCI-e controller and the main processor;
   wherein the first PCI-e bus extends outside the first and second gaming enclosures and is secured by one or more doors, locks, sensors, evidence tape, or combinations thereof.

2. The system of claim 1, further comprising a third PCI-e bus for communication between the main processor and a video card, the third PCI-e bus extending outside the first gaming enclosure and is secured by one or more doors, locks, sensors, evidence tape, or combinations thereof.

3. The system of claim 2, wherein the video card is positioned within the display of the gaming machine device to reduce the temperature in the first gaming enclosure.

4. The system of claim 1, wherein the at least one peripheral device is passive and responds only to commands from the PCI-e controller to prevent access to the first and second gaming enclosures.

5. The system of claim 1, wherein the first and second gaming enclosures are secured by one or more doors, locks, sensors, evidence tape, or combinations thereof.

6. The system of claim 1, wherein the at least one critical gaming device further comprises a static, non-volatile random access memory (NV-RAM), an electronic erasable programmable read only memory (EEPROM), and an extended basic input output system (BIOS).

7. The system of claim 6, wherein the NV-RAM stores critical gaming programs and functions therein.

8. The system of claim 6, wherein the EEPROM stores critical gaming machine data and functions therein.

9. The system of claim 1, further comprising an authenticator coupled to the main processor to authenticate hardware and software on the gaming machine.

10. A modular gaming machine system, comprising:
    a gaming machine including:
    a cabinet having a main door;
    a first gaming enclosure, secured within and enclosed by the cabinet, enclosing a main processor board having a main processor;
    at least one interface coupled to the main processor board to receive a first PCI-e bus;
    at least one access port on a gaming machine monitor to receive a free end of the first PCI-e bus; and
    a second gaming enclosure, secured within and enclosed by the cabinet, enclosing a PCI-e controller for communicating with at least one peripheral device on the gaming machine, wherein the second gaming enclosure enclosing the PCI-e controller is accessed by opening the main door of the cabinet, wherein the main processor is configured to control a game of chance played on the gaming machine by executing game code that uses a plurality of gaming instructions received via a first PCI-e bus from the PCI-e controller, said PCI-e controller connected via a second PCI-e bus to one of the at least one peripheral device;

a video card coupled to the gaming machine monitor, wherein the video card communicates with the main processor via the first PCI-e bus.

11. The system of claim 10, further comprising a back plane having at least one critical gaming device, the at least one critical gaming device further comprises a static, non-volatile random access memory (NV-RAM), an electronic erasable programmable read only memory (EEPROM), and an extended basic input output system (BIOS).

12. The system of claim 11, wherein the NV-RAM stores critical gaming programs and functions therein.

13. The system of claim 11, wherein the EEPROM stores critical gaming machine data and functions therein.

14. The system of claim 11, wherein the back plane comprises the PCI-e controller for communicating with the at least one peripheral device on the gaming machine and the at least one critical gaming device.

15. The system of claim 14, further comprising a third PCI-e bus for communication between the PCI-e controller and the main processor, the third PCI-e bus secured by one or more doors, locks, sensors, evidence tape, or combinations thereof.

16. The system of claim 13, wherein the at least one peripheral device is passive and responds only to commands from the PCI-e controller to prevent access to the at least one critical gaming device.

17. The system of claim 10, wherein the main processor board is secured by one or more doors, locks, sensors, evidence tape, or combinations thereof.

18. The system of claim 11, wherein the back plane is secured by one or more doors, locks, sensors, evidence tape, or combinations thereof.

19. The system of claim 10, further comprising an authenticator coupled to the main processor to authenticate hardware and software on the gaming machine.

20. A modular gaming machine system, comprising:
   a gaming machine including:
      a cabinet including a main door;
      a first gaming enclosure having a main processor at least one interface coupled to the first gaming enclosure to receive a first PCI-e bus;
      a second gaming enclosure enclosing a PCI-e controller for communicating with at least one peripheral device on the gaming machine, wherein the second gaming enclosure enclosing the PCI-e controller is accessed by opening the main door of the cabinet;
      at least one critical gaming device coupled to the second gaming enclosure and in communication with the PCI-e controller, wherein the main processor is configured to control a game of chance played on the gaming machine by executing game code that uses a plurality of gaming instructions received via a first PCI-e bus from the PCI-e controller, said PCI-e controller connected via a second PCI-e bus to one of the at least one peripheral device; and
      at least one access port coupled to the second gaming enclosure to receive a free end of the first PCI-e bus, the first PCI-e bus for communication between the PCI-e controller and the main processor;
      wherein the first PCI-e bus extends outside the first and second gaming enclosures and is secured by one or more doors, locks, sensors, evidence tape, or combinations thereof.

21. The system of claim 1, wherein the at least one peripheral device includes a plurality of peripheral devices, said system further comprising a plurality of PCI-e buses configured to connect the plurality of peripheral devices with the PCI-e controller.

22. The modular gaming machine system of claim 20, wherein the at least one peripheral device includes a plurality of peripheral devices, said modular gaming machine system further comprising a plurality of PCI-e buses configured to connect the plurality of peripheral devices with the PCI-e controller.

* * * * *